3,000,708
PROCESS FOR THE PREPARATION OF SODIUM CHLORIDE BY THE EVAPORATION OF SOLUTIONS
Hans Kapsenberg, Hengelo, Netherlands, assignor to N.V. Koninklijke Nederlandsche Zoutindustrie, Hengelo, Netherlands, a limited liability company of the Netherlands
No Drawing. Filed June 25, 1956, Ser. No. 593,362
Claims priority, application Netherlands July 19, 1955
6 Claims. (Cl. 23—303)

During the technical preparation of sodium chloride by the evaporation of solutions the solution primarily formed is supersaturated. This supersaturation is neutralized by the formation of new crystals (formation of nuclei) and by the growth of the crystals present. The grain size of the product is determined by the ratio between the quantity of crystallized salt and the number of crystals, i.e. by the way in which the extent of the formation of nuclei and the rate of growth are affected by the manufacturing process and the construction of the equipment.

Since for some applications a large size of the grains is required, many attempts have been made to prepare this coarser salt. It is striking that for this preparation it is practically always necessary to make drastic alterations in the existing equipment. It has indeed been described in the British patent specification No. 617,137 that coarser salt can be obtained by the addition of tetraalkylammonium salts or polyethylene-oxy compounds, but this only applies to the preparation of pan salt.

Now it was found that without any alteration in the equipment a considerable increase of the size of the crystals formed is obtained if compounds supplying nitrilotriacetate ions are present during the crystallization. In this case the extent of the formation of nuclei is apparently reduced as compared with the rate of growth.

The quantity of the compounds added need only be small, e.g. less than 100 mg./litre, while at a concentration of 1 mg./litre the effect is negligible. The preferred concentration is 10 to 60 mg./litre. The effect of the nitrilotriacetate ions can be enhanced even more by means of small quantities of dimethylglyoxim. A quantity of ½ to 50 mg./litre is sufficient; the preferred concentration is 1 to 20 mg./litre.

The application of brine containing nitrilotriacetate ions in equipment in which crystals are present in the boiling zone moreover results in a considerable reduction of the incrustation of salt on the walls of the equipment, with a consequent lower loss of heat and a greater production. The salt prepared in this equipment according to the new process further has a higher bulk weight than salt prepared by the conventional method. This involves a saving of packaging material and storage space. The strewability of the salt, too, appears to have been considerably improved. As a measure of the strewability may be taken the quantity by weight of salt which flows from an opening per unit of time under standardized conditions.

According to another method of preparing salt a supersaturated solution of salt is made by causing some water to evaporate from brine, in which case the formation of salt crystals is avoided. The supersaturated solution then passes through a crystallizer with a movable bed. Here crystallization takes place, and the liquor leaving the crystallizer is evaporated again to supersaturation. This method enables the production of large grains of salt, which, however, are usually round and often brittle. In consequence of the latter property, breakage will often occur during transport, storage under high pressure, and the like.

However, if the brine contains nitrilotriacetate ions, this involves—apart from the advantage of coarser salt already mentioned—less incrustation and a higher bulk weight again, but moreover the additional effect that the grains are appreciably harder; they often have sharp edges and points, and are more transparent.

It is possible to gain some idea of the hardness of the crystals by subjecting them for a predetermined time in a standardized manner to disintegration in a ball mill. The ratio between the average particle sizes after and before the test is then a measure of the hardness.

Suitable compounds supplying nitrilotriacetate ions are, among others, nitrilotriacetic acid, its salts, and its esters.

*Example I*

In an apparatus brine was evaporated in such a manner that the crystallization took place in the boiling zone. Nitrilotriacetic acid in a quantity of 20 mg./litre had been added to the brine. From screen analyses it was found that the salt obtained in this way contained 88% more salt with a diameter greater than $420\mu$ than salt prepared in the same apparatus, without addition of nitrilotriacetic acid, but otherwise under perfectly identical conditions.

The bulk weight of the salt was 10 to 15% higher than that of salt normally produced in this apparatus, while the strewability, determined in the manner described above, had increased by 40%.

The preparation involved much less incrustation, so that the production of salt could be continued about twice as long as usual without the necessity of rinsing the apparatus.

*Example II*

In an apparatus brine was evaporated in such a manner that the crystallization did not take place in the boiling zone, but in a separate crystallizer with a movable crystal bed. Sodium nitrilotriacetate in a quantity of 30 mg./litre was added to the brine. Under certain conditions of the test, salt with an average particle size of 2.17 mm. was obtained, whilst the average size attained without addition was 1.80 mm. The bulk weight now was 5 to 15% higher and the salt was sharper than normally and considerably more transparent. The hardness, determined in the manner described above, gave a factor 0.72, whilst the factor of salt prepared without addition was 0.48.

The preparation involved much less incrustation, so that the production of salt could be continued about five times as long as usual without the necessity of rinsing the apparatus.

An extra addition of 5 mg. of dimethylglyoxim per litre of brine gave an average particle size of 2.45 mm., while the hardness factor was 0.86.

Reduction of the content of sodium nitrilotriacetate to 10 mg./litre finally gave a particle size of 1.99 mm., i.e. still a considerable increase as compared with the blank test.

What I claim is:
1. Process for the manufacture of sodium chloride having a relatively high bulk density, said process resulting in salt having improved strewability and further resulting in minimized encrustation during processing, said process comprising adding to a solution of sodium chloride a compound supplying nitrilotriacetate and evaporating the solution.

2. Process for the manufacture of sodium chloride having a relatively high bulk density, said process resulting in salt having improved strewability and further resulting in minimized encrustation during processing, said process comprising adding to a solution of sodium chloride a compound supplying nitrilotriacetate ions in an amount between 1 and 100 mg./litre of the solution.

3. Process for the manufacture of sodium chloride having a relatively high bulk density, said process resulting in salt having improved strewability and further resulting in minimized encrustation during processing, said process comprising adding to a solution of sodium chloride a compound supplying nitrilotriacetate ions in an amount between 10 and 60 mg./litre of the solution.

4. Process for the manufacture of sodium chloride having a relatively high bulk density comprising adding to a solution of sodium chloride a compound supplying nitrilotriacetate ions and dimethyl glyoxim and evaporating the solution.

5. Process for the manufacture of sodium chloride having a relatively high bulk density comprising adding to a solution of sodium chloride a compound supplying nitrilotriacetate ions in an amount between 1 and 100 mg./litre and an amount of dimethyl glyoxim between ½ and 50 mg. and evaporating the solution.

6. Process for the manufacture of sodium chloride having a relatively high bulk density comprising adding to a solution of sodium chloride a compound supplying nitrilotriacetate ions in an amount of between 10 and 60 mg./litre and an amount of dimethylglyoxim between 1 and 20 mg. and evaporating the solution.

References Cited in the file of this patent

UNITED STATES PATENTS

| | | |
|---|---|---|
| 2,642,335 | May et al. | June 16, 1953 |
| 2,655,438 | Gilkey | Oct. 13, 1953 |

FOREIGN PATENTS

| | | |
|---|---|---|
| 617,137 | Great Britain | Feb. 1, 1949 |